Figure 1:
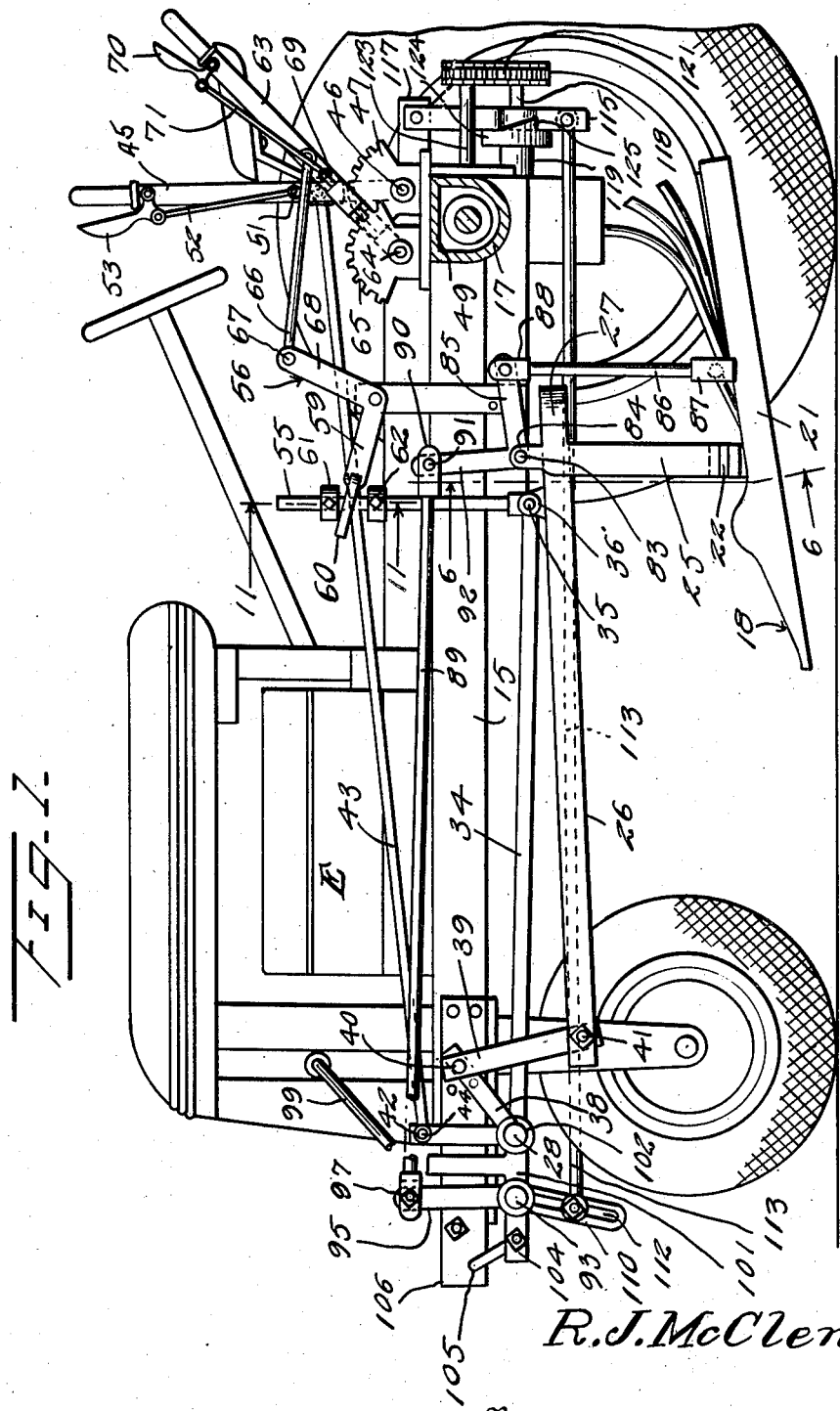

Aug. 28, 1945.  R. J. McCLENNY  2,383,506
PEANUT OR POTATO DIGGER
Filed July 27, 1942  4 Sheets-Sheet 1

Inventor
R. J. McClenny
By Kimmel & Crowell
Attorneys

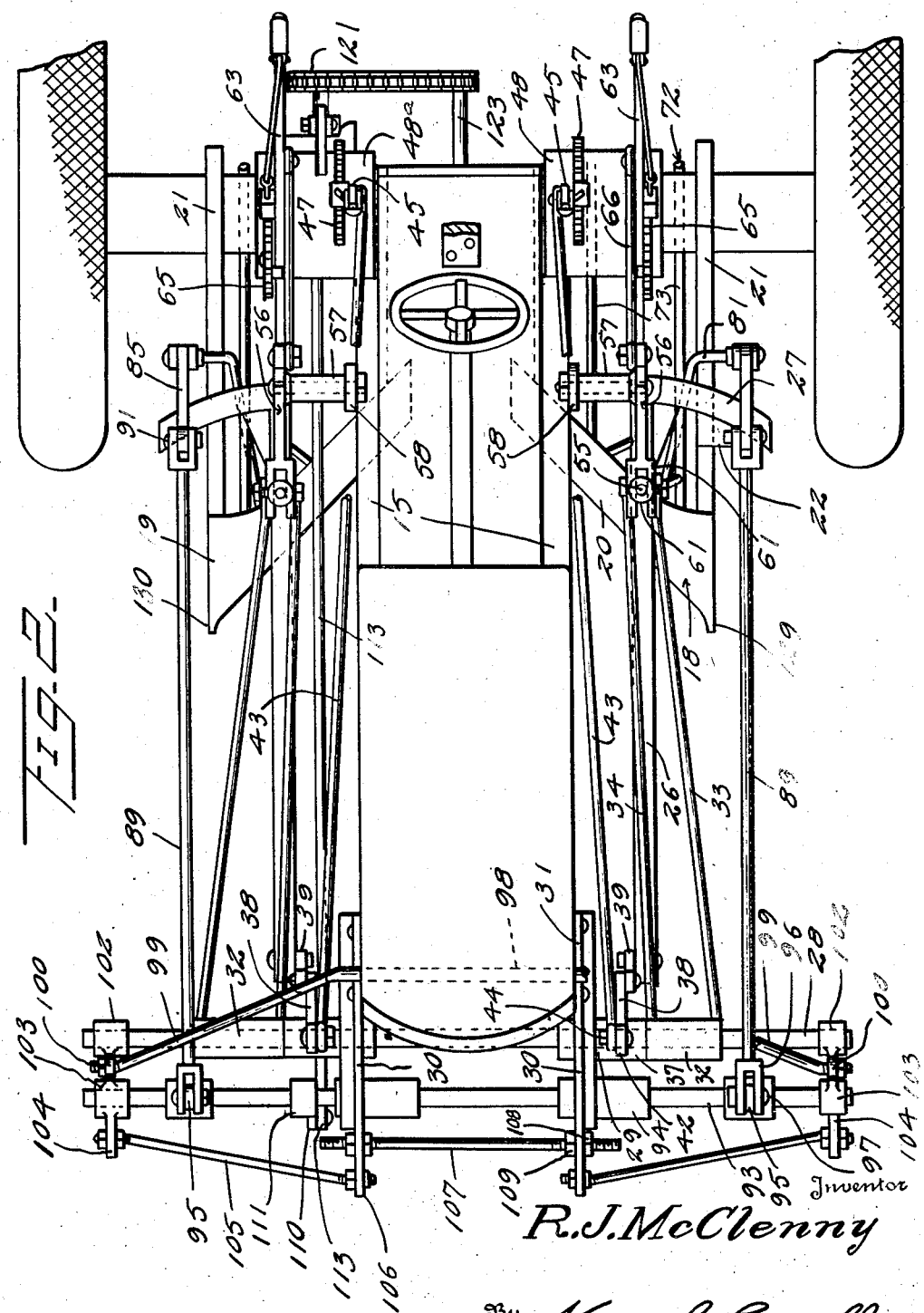

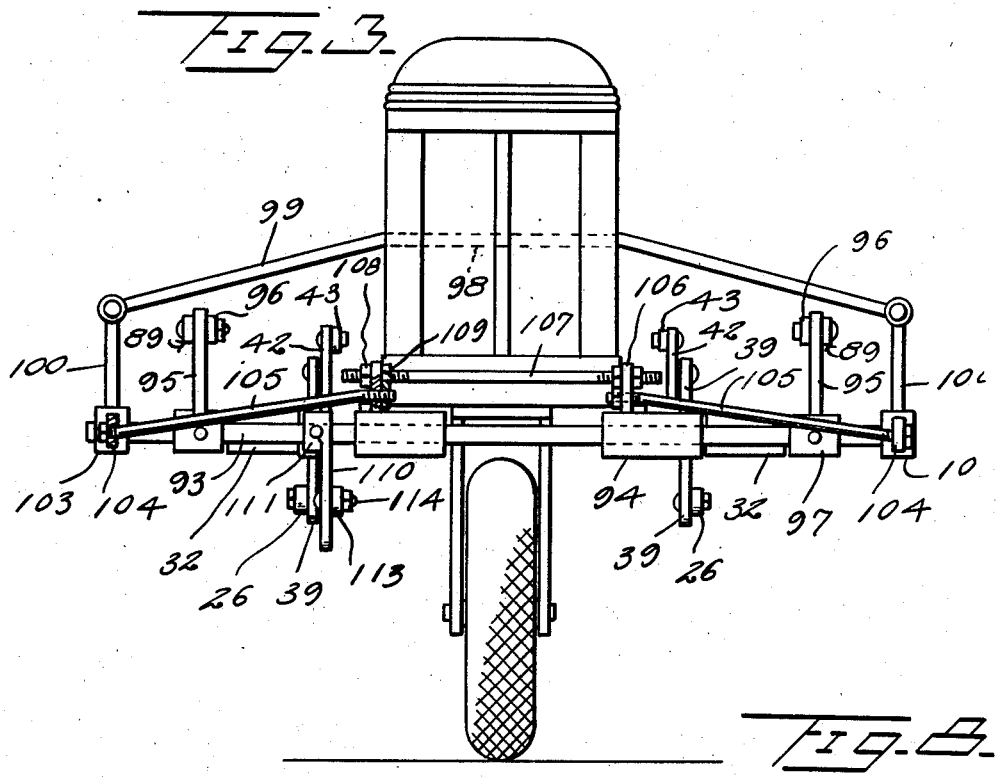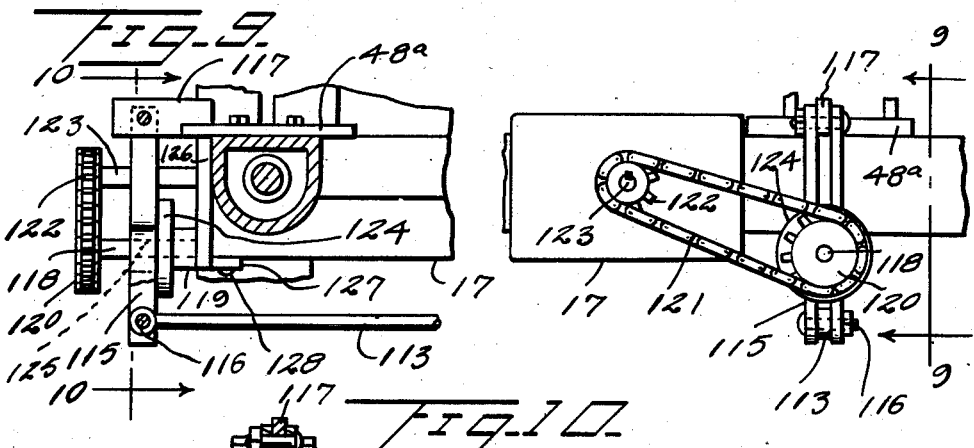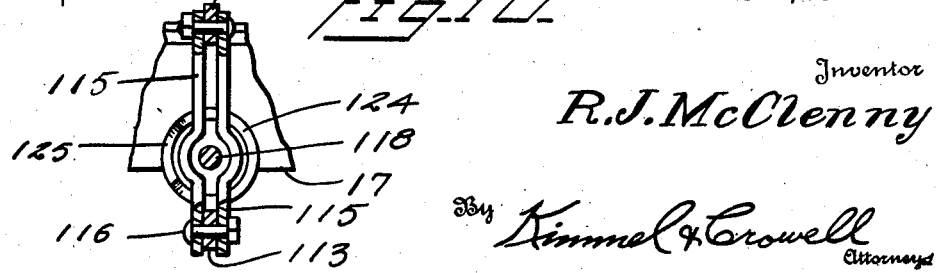

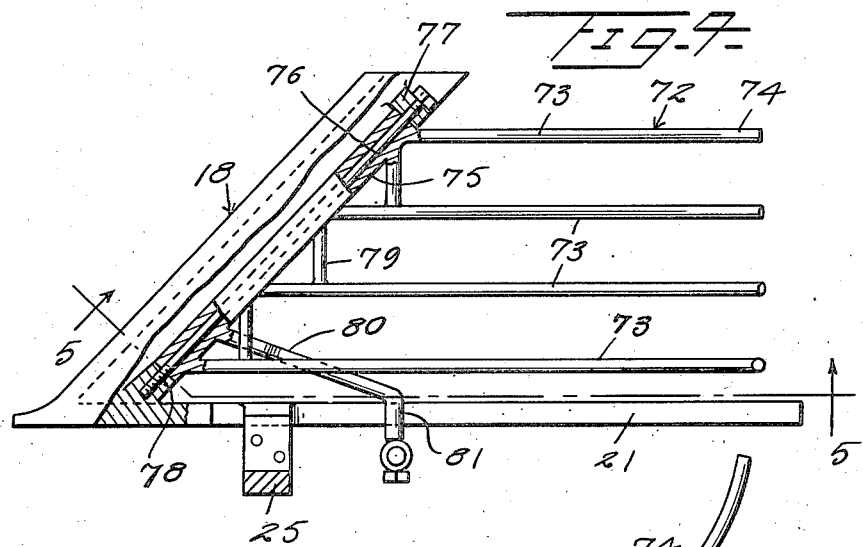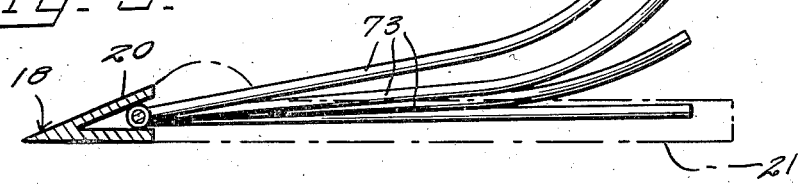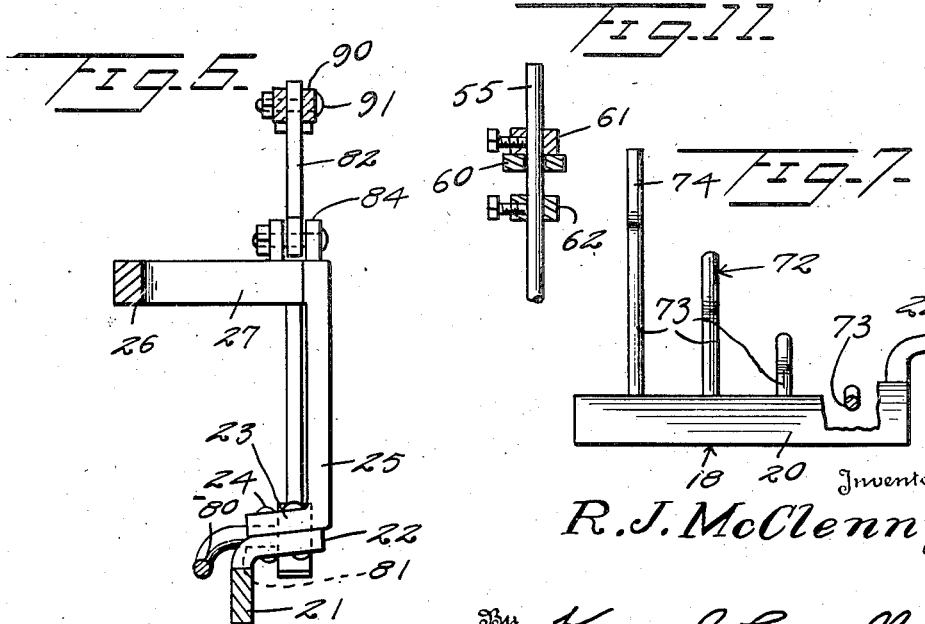

Patented Aug. 28, 1945

2,383,506

UNITED STATES PATENT OFFICE 2,383,506

PEANUT OR POTATO DIGGER

Robert J. McClenny, Palatka, Fla.

Application July 27, 1942, Serial No. 452,515

7 Claims. (Cl. 55—110)

This invention relates to a peanut or potato digging machine and more particularly, to an attachment of this character which may be detachably mounted on a tractor or other supporting structure.

An object of this invention is to provide an attachment for a tractor which is so constructed that it will dig peanuts or potatoes and at the same time remove the dirt therefrom.

Another object of this invention is to provide in an attachment of this kind, a plow or digging member and means connected to the plow or digging member which is adapted to not only remove the dirt from the articles, but to also throw the articles in a central row above the ground.

A further object of this invention is to provide an improved dirt removing structure which is mounted on the rear of the plow or digging member and which is so constructed that it will overturn the articles as these articles are discharged on top of the ground.

A still further object of this invention is to provide a structure of this kind, wherein the plow structure may be used for either peanut or potato digging, and the vibratory dirt removing means may be used as an attachment for the plow so that proper vibratory attachment may be used for the particular articles which are being removed from the ground.

A further object of this invention is to provide in a structure of this kind, an improved plow and dirt removing means together with means for suspending the plow relative to the tractor and also for leveling the plow in its lowered position so that the plow will move in a horizontal plane at the desired depth in the ground.

A further object of this invention is to provide an improved vibratory dirt removing and article overturning means which includes an improved operator connected to the power take-off of the tractor so that the dirt removing means can be given the desired vibratory motion.

A further object of this invention is to provide a structure of this kind, wherein the degree of vibration may be varied or adjusted at will so as to vibrate the articles which are removed from the ground sufficiently to remove the dirt adhering thereto.

To the foregoing objects and to others which may hereinafter appear, the invention consists of the novel construction, combination and arrangement of parts as will be more specifically referred to and illustrated in the accompanying drawings, wherein are shown embodiments of the invention, but it is to be understood that changes, variations and modifications may be resorted to which fall within the scope of the invention as claimed.

In the drawings:

Figure 1 is a detail side elevation of a tractor, partly broken away, having an attachment constructed according to an embodiment of this invention mounted thereon, Figure 2 is a detail top plan of the attachment, portions of the attachment being broken away, Figure 3 is a detail front elevation of the tractor and the forward end of the attachment, Figure 4 is a plan view partly in section and partly broken away of one of the combined digging and dirt removing members, Figure 5 is a sectional view taken on the line 5—5 of Figure 4, Figure 6 is a sectional view taken on the line 6—6 of Figure 1, Figure 7 is a detail front elevation partly broken away of one of the plow members, Figure 8 is a fragmentary rear elevation of the tractor showing the connection between the vibratory operating means and the power take-off, Figure 9 is a sectional view taken on the line 9—9 of Figure 8, Figure 10 is a sectional view taken on the line 10—10 of Figure 9, Figure 11 is a sectional view taken on the line 11—11 of Figure 1.

Referring to the drawings, the numeral 15 designates generally the frame of a tractor and the letter E designates the engine, which is mounted on the frame 10, and operatively connected to the rear wheels 16 of the tractor through a rear axle structure 17. A pair of plow members 18 and 19 are disposed beneath the frame structure 15 and the plow members 18 and 19 are disposed in forwardly divergent relation with their inner convergent ends spaced apart beneath substantially the center of the tractor frame 10. The plow member 18 includes a blade structure 20 which, as shown in Figure 5, is substantially V-shaped in transverse section, and a rearwardly extending landside 21 is formed with the blade structure 20 and extends rearwardly from the forward end of the blade structure 20 and in parallel relation with the frame 15.

A laterally projecting lug 22 is carried by the landside 21 and a plow supporting foot 23 is secured to the lug 22 by fastening devices 24, as shown in Figure 6. The plow supporting foot 23 is carried by and projects inwardly from the lower end of a vertical beam part 25. A plow beam member 26 is disposed at one side of the frame 15 and preferably slightly below the frame and is provided at its rear end with an outwardly projecting arcuate extension 27 which is formed integral with the rear end of the beam 26 and is also integral with the upper end of the upright 25. A plow beam supporting shaft 28 is disposed at the forward end of the frame 15 and extends transversely thereof, the supporting shaft or member 28 being mounted in bushings 29 carried by a pair of forwardly projecting angle bars 30 which are fixed to the opposite sides of the frame 15 at the forward end thereof and detachably secured to the frame 15 by fastening devices 31.

A sleeve 32 is loosely mounted on the shaft 28 laterally of the supporting member 30 and a pair of rearwardly projecting convergent draw bars 33 and 34 are fixed at their forward ends to the sleeve 32. The draw bars 33 and 34 at their rear or convergent ends are mounted on a pin 35 carried by an upstanding lug 36 which is fixed to the rear portion of the plow beam 26. A sleeve 37 is also mounted on the shaft or supporting member 28 inwardly of the sleeve 32 and an arm 38 is fixed to the sleeve 37. A link 39 is pivotally connected at one end as by a pivot 40 to the arm 38 and the link 39 is pivotally connected as by a pivot bolt 41 to the forward end of the plow beam 26.

The arm 38 comprises a plow levelling arm which is adapted to raise or lower the forward end of the beam 26 so as to thereby adjust the inclination of the plow 18. A second arm 42 is fixed to the sleeve 37 and the forward end of a plow levelling link 43 is pivotally mounted as at 44 on the upper end of the arm 42. A hand lever 45 is disposed at the rear of the frame structure 15 being mounted on a pivot 46 which is disposed axially of a toothed quadrant 47 carried by a supporting plate 48 which is fixed to the flat upper surface 49 of the axle structure 17 by means of bolts or fastening devices 50.

A spring-pressed locking dog 51 is carried by the hand lever 45 and connected by a link 52 to a pawl operating lever 53 which is pivotally carried by the upper portion of the hand lever 45. The rear end of the levelling link 43 is pivotally connected as at 54 to the lever 45.

The plow structure 18 is adapted to be raised to an inoperative position or lowered to an operative position by means of a vertically disposed rod 55 which at its lower end is pivotally mounted on the pin 35. A bell crank 56 is rockably mounted on an outstanding support 57 and the support 57 is secured to the frame 15 by a supporting plate 58. The forward or lifting leg 59 of the bell crank 56 is provided with a fork 60 within which the rod 55 is received and the rod 55 is provided with an upper collar 61 and a lower collar 62 between which the fork 60 engages. The two collars 61 and 62 may be adjusted lengthwise of the lifting rod 55 to the desired position so that the plow 18 may be elevated to the desired point upon rocking of the bell crank 56. A plow elevating or lowering hand lever 63 is rockably mounted on a pivot 64 carried by a toothed quadrant 65 carried by the plate 48 laterally and forwardly of the quadrant 47.

The bell crank 56 is connected to the hand lever 63 by means of a link 66 which at its forward end is pivotally connected as at 67 to the second leg 68 of the bell crank 56. A spring-pressed dog or pawl 69 is carried by the hand lever 63 and engages the teeth of the quadrant 65. A dog operator or lever 70 is pivotally carried by the hand lever 63 adjacent the upper end thereof and the hand lever 70 is connected by means of a link 71 to the dog or pawl 69.

The plow member 18 has operatively associated therewith a combined dirt removing and article throwing structure generally designated as 72. The combined dirt removing and article throwing structure 72 comprises a plurality of parallel tines or bars 73 which at their rear portions 74 are curved upwardly. The bars or tines 73 are fixed to a tubular shaft 75 which is rockably mounted on a bolt 76 engaging through an ear 77 carried by the plow 18 and the bolt 76 is threaded into a boss 78 on the outer portion of the plow 18.

The tubular rock shaft 75 is disposed between the divergent sides of the blade 20 so that the articles loosened and removed by means of the blade 20 will pass over the rear end of the blade 20 and slide over the bars 73. The bars 73 are preferably braced by means of bracing members 79 which are fixed to the forward portions of the bars 73 and also fixed as by welding or the like to the tubular shaft 75. The bars 74 are spaced apart a sufficient distance so that the articles removed by the plow 18 will not drop therebetween, whereas any loosened dirt may readily drop between the bars 73. These bars 73 are also arranged in progression with an inner bar 73 being provided with a lower arcuate portion 74 than a succeeding bar 73, the outer bar 73 being substantially higher than the inner bar 73 so that when the dirt removing and row forming structure 72 is vibrated, the material will be given an inward movement so as to dispose the material in a row above the ground and substantially beneath the center of the frame structure 15.

A rearwardly extending shaker arm 80 is fixed to the rock shaft 75 and extends rearwardly therefrom and is provided with an extension 81 which engages over the top of the landside 21. A bell crank 82 is rockably mounted on a pin 83 carried by a pair of upstanding ears 84 which are fixed to the outer portion of the beam extension 27 in a position substantially above the upright 25. One leg 85 of the bell crank 82 is connected to the extension 81 by means of a link 86, the link 86 having at its lower end a coupling 87 engaging the outer end of the extension 81.

The link 86 at its upper end is provided with a coupling 88 engaging the bell crank leg 85 and preferably the coupling 88 is in the form of a bifurcated coupling, whereas the coupling 87 may be a ball and socket coupling. A bell crank operator link 89 is provided at its rear end with a bifurcated portion 90 and a pin 91 engages through the bifurcated portion 90 and also through a second leg 92 of the bell crank 82.

A rock shaft 93 is disposed at the forward end of the frame 15, the shaft 93 being rockably mounted in bearing sleeves 94 carried by the supporting members 30 forwardly of the sleeve 28. The shaft 93 has secured thereto laterally or outwardly from the bearing sleeve 94, an upstanding arm 95, and the forward end of the link 89 is provided with a bifurcated portion 96 between which the arm 95 engages. A bolt or pivot member 97 connects the bifurcated portion 96 with the upper end portion of the arm 95. A supporting and bracing bar including an inner horizontal portion 98 and a pair of oppositely disposed outwardly, forwardly and downwardly bent portions 99 is clearly shown by Figure 2. The portion 98 of this bar engages through the tractor structure above the frame 15 and forwardly of the engine E. The outer or forward ends of the inclined portions 99 of this bar are secured to upwardly extending arms 100 carried by connecting members 101 each provided at the opposite ends thereof with a pair of sleeves 102 and 103 which engage the shafts 28 and 93, respectively.

The shaft 93 is rockably mounted in the sleeve 103, whereas the shaft 28 may be fixed in the sleeve 102. A forwardly projecting arm 104 projects forwardly of the sleeve 103 and a bracing rod 105 is secured at one end to the arm 104. The opposite or inner end of the rod 107 is mounted in an extension 106 carried by the supporting member 30. A tie rod 107 engages between the two extensions 106 of the supporting members 30 and this tie rod is fixed to the extensions 106 by means of locked nuts 108 and 109 so that the supporting members 30 may be fixed to tractor frames of varying widths.

An arm 110 is fixed to a sleeve or bushing 111 which is keyed or otherwise fixed to the agitator shaft 93 at one side of the frame structure 15. The arm 110 is provided with an elongated slot 112 and the forward end of an agitator link 113 is adjustably secured to the arm 110 by means of a pivot bolt 114. The rear end of the agitator link 113 is rockably mounted between a pair of spaced apart bars 115, the rear end of the link 113 being pivotally mounted on a pivot bolt 116 engaging through the two bars 115. The bars 115 are rockably supported from a rearwardly projecting supporting arm 117 which is carried by a plate 48a on the side of the machine opposite from the plate 48. A rotary shaft 118 is rotatably carried by a bearing 119 dependingly supported below the bar or arm 117, and the shaft 118 has fixed thereto a sprocket 120. A driving chain 121 is trained about the sprocket 120 and also about a driving sprocket 122 which is fixed to a power take-off shaft 123 forming part of the tractor structure. A cam plate 124 is fixed to the shaft 118, being provided with a cam lobe 125 which is adapted to engage the rear edges of the two rock levers 115 so as to rock these levers 115 and pull the link 113 rearwardly. The bearing 119 is preferably secured to the plate 48a by means of a plate 126 and an extension 127 is formed with the plate 126 and engages beneath the axle housing structure 17 and is secured by a fastening device 128.

It will be understood that the supporting structure for the plow 19 is of the same character as that for the plow 18, and the description of the supporting structure for the plow 18 including the levelling and elevating means will apply equally as well to the plow 19. The two plows 18 and 19 are preferably provided with a forwardly projecting nose 129 and 130 which projects forwardly of the blade 20 and substantially in line with the landslide 21.

In the use and operation of the digging and row forming attachment shown in Figures 1 to 11 inclusive, the shafts 28 and 93 are supported by the supporting bar 98—99 at the forward end of the frame 10 and by means of the supporting members 30 which are fixed to the sides of the frame 15 at the forward end thereof. The two plates 48 and 48a are fixed to the upper side of the axle structure 17, and the driven sprocket 120 is connected by the flexible member or chain 121 to the driving sprocket 122 carried by the power take-off shaft 123. The tractor is operated in the usual manner with the two plows 18 and 19 engaging a pair of rows of potatoes, peanuts or the like, and by positioning the two plows 18 and 19 beneath the frame 15, the operator can readily see the condition of the material being removed from the ground and can readily see how the structure is operating.

The plows 18 and 19 are lowered to an operative position by means of the lever 63 and when the plows 18 and 19 are lowered to the desired depth, they may be leveled by means of the leveling lever 45. This lever 45 will raise or lower the beam 26 so as to maintain the plows 18 and 19 in the desired position beneath the ground.

Coincident with the forward movement of the plows 18 and 19, the agitating members and row forming members 72 will be vertically rocked by means of the cam lobe 125. In this manner, the dirt adhering to the potatoes or peanuts will be shaken off and will drop down rearwardly of the plows 18 and 19, and the peanut plants or potatoes will be thrown toward the center of the tractor structure beneath the frame 15. It will be noted that the inner convergent ends of the two plows 18 and 19 are spaced apart a slight distance so that these plows will not turn up any dirt at the point where the row is being formed of the removed potatoes or peanuts which are discharged on top of the ground.

What I claim is:

1. In a tractor having a power take-off, a combined digger and dirt removing attachment, comprising a plow member of V-shape contour in transverse section, means supporting said member from the tractor, a plurality of substantially parallel shaker bars, bracing means between said bars, a tubular member secured to the forward ends of said bars, means arranged within and connected to the plow member and extending through said tubular member rockably mounting said shaker bars on said plow member, and means connecting said tubular member with said power take-off.

2. In a tractor having a power take-off, a combined digger, dirt removing and material piling attachment comprising a plow member, means for lowering the plow member to operative position, means whereby said plow may be leveled when in said lowered position, means supporting said member from the tractor, a shaker means comprising a plurality of substantially parallel bars extending rearwardly of said plow member and formed with upwardly curved rear portions, a tubular bearing member common to and secured to the forward ends of said bars, means fixed to said plow member and extending through said tubular member for pivotally connecting the latter to the plow member, and means connecting said tubular member to said power take-off, said bars being so positioned relative to said plow member as to force the material laterally of the plow member.

3. An attachment for a tractor comprising a pair of plow members disposed in forwardly divergent relation beneath the frame of the tractor, the rear convergent ends of said members being disposed in spaced apart relation, a vertical beam part secured to each plow member, a plow beam member connected to each beam part and extending forwardly therefrom, a transversely disposed stationary shaft, means fixedly securing said shaft to the tractor frame with the ends of said shaft extended laterally from the sides of the tractor frame, a pair of sleeves rockable on said shaft and disposed one adjacent to each side of the tractor frame, a pair of rearwardly convergent draw-bars arranged adjacent each side of the tractor frame and fixed at their forward ends to one of said sleeves, a pair of pivot means for pivotally securing the rear ends of the pairs of draw-bars with the said plow beam members, means connected to each of said pivot means and connected to the tractor frame for elevating or lowering a plow beam member to vertically adjust a plow member, a second pair of sleeves carried by said shaft inwardly of the said other sleeves, a pair of upstanding divergent arms carried by each of said second sleeves, a link pivotally connected to the forward end of each plow beam member and to one of the arms of each pair of arms, a leveling lever for each of said plow members, and means for connecting said levers to the other arm of said pair of arms.

4. In a tractor having a power take-off, a combined digger and dirt removing attachment comprising a plow member, means supporting said member from the tractor, means for maintaining said plow member in vertically adjusted position, a shaker means including a plurality of substantially parallel bars pivotally carried by said plow member, an arm fixed to said shaker means, a bell crank, means pivotally supporting said bell crank, means connecting said bell crank with said arm, a rock shaft, means pivotally supporting said rock shaft, an arm fixed to said shaft, means connecting said latter arm to said bell crank, a slotted arm fixed to said shaft, a connecting rod pivotally secured at one end to said slotted arm, a countershaft, means rotatably supporting said countershaft, a cam member carried by said countershaft, a depending rock lever disposed in a position for engagement with said cam member, means securing the other end of said connecting rod to said lever, and means connecting said countershaft with the tractor power take-off.

5. An attachment for a tractor comprising a pair of rearwardly convergent plow members, spaced means for connection to said members and to the tractor frame for independently swingably supporting said members with the inner ends of the members disposed beneath the tractor frame in spaced relation, spaced means connected to said members and for connection to the tractor frame for selectively elevating or lowering said members, a pair of shaker means, each of said shaker means pivotally supported by and extended rearwardly from a plow member, a common operating means for said pair of shaker means, and means for connecting said common operating means with a power take-off of the tractor.

6. An attachment for a tractor comprising a pair of rearwardly convergent plow members, spaced means connected with said members and with the tractor frame for independently swingably supporting said members from the tractor frame with the inner ends of said members disposed beneath the tractor frame, spaced means connected with said members and with the tractor frame for selectively raising or lowering said plow members, a pair of shaker means each including a plurality of spaced bars, each of said shaker means being carried by and extending rearwardly from a plow member, a common operating means for said pair of shaker means, means for connecting said common operating means for the pair of shaker means to the power take-off of the tractor, each of said bars being provided with upwardly curved rear portions, and each of said shaker means including braces arranged between the bars thereof.

7. An attachment for a tractor comprising a pair of rearwardly convergent plow members, spaced means connected with said members and with the tractor frame for independently swingably supporting said members from the tractor frame with the inner ends of said members disposed beneath the tractor frame, spaced means connected with said members and with the tractor frame for selectively raising or lowering said plow members, a pair of shaker means each including a plurality of spaced bars, each of said shaker means being carried by and extending rearwardly from a plow member, a common operating means for said pair of shaker means, means for connecting said common operating means for the pair of shaker means to the power take-off of the tractor, each of said bars being provided with upwardly curved rear portions, said rear portions being arranged in different horizontal planes, and each of said shaker means including braces arranged between the bars thereof.

ROBERT J. McCLENNY.